United States Patent [19]
Bedner

[11] 3,918,471
[45] Nov. 11, 1975

[54] GATE VALVE DEVICE

[75] Inventor: Michael P. Bedner, Monessen, Pa.

[73] Assignees: Bernard S. Shire; Jack L. Bergstein; Franklin L. Bialon; Harold J. Hazelbaker, all of Monessen, Pa.

[22] Filed: May 23, 1973

[21] Appl. No.: 362,881

[52] U.S. Cl. ............... 137/238; 137/240; 251/326; 251/327
[51] Int. Cl.² ................ F16K 3/36; F16K 29/00
[58] Field of Search ........... 137/240, 238; 251/326, 251/327, 328

[56] References Cited
UNITED STATES PATENTS

| | | | |
|---|---|---|---|
| 2,315,058 | 3/1943 | Holt et al. | 137/240 X |
| 2,584,083 | 1/1952 | Mellett | 137/238 |
| 3,256,897 | 6/1966 | Carlton | 137/238 X |
| 3,466,010 | 9/1969 | Jung | 251/58 X |
| 3,547,140 | 12/1970 | Hastings | 137/240 |

FOREIGN PATENTS OR APPLICATIONS

| | | | |
|---|---|---|---|
| 515,829 | 1/1931 | Germany | 251/328 |
| 1,152,283 | 9/1957 | France | 251/327 |

Primary Examiner—Arnold Rosenthal
Attorney, Agent, or Firm—Millen, Raptes & White

[57] ABSTRACT

The invention relates to a gate valve device for regulating the flow of combustible mixtures of air and powdered coal into a boiler in which the gate valve operates within an enclosed chamber and which utilizes compressed air to reduce the friction involved in opening and closing the valve, to prevent the gate valve from becoming clogged and to prevent combustible gases from escaping around the gate valve seat.

2 Claims, 4 Drawing Figures

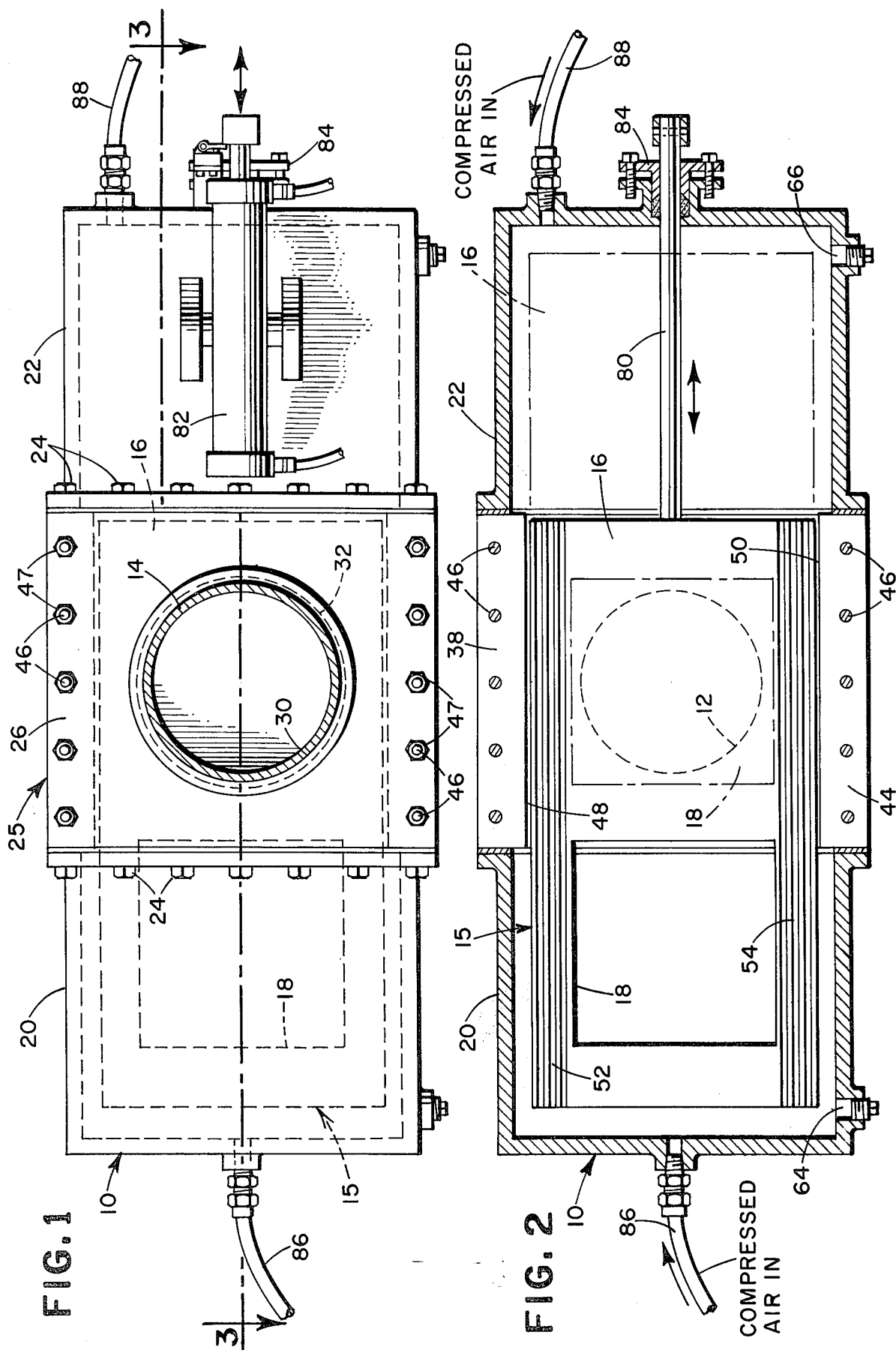

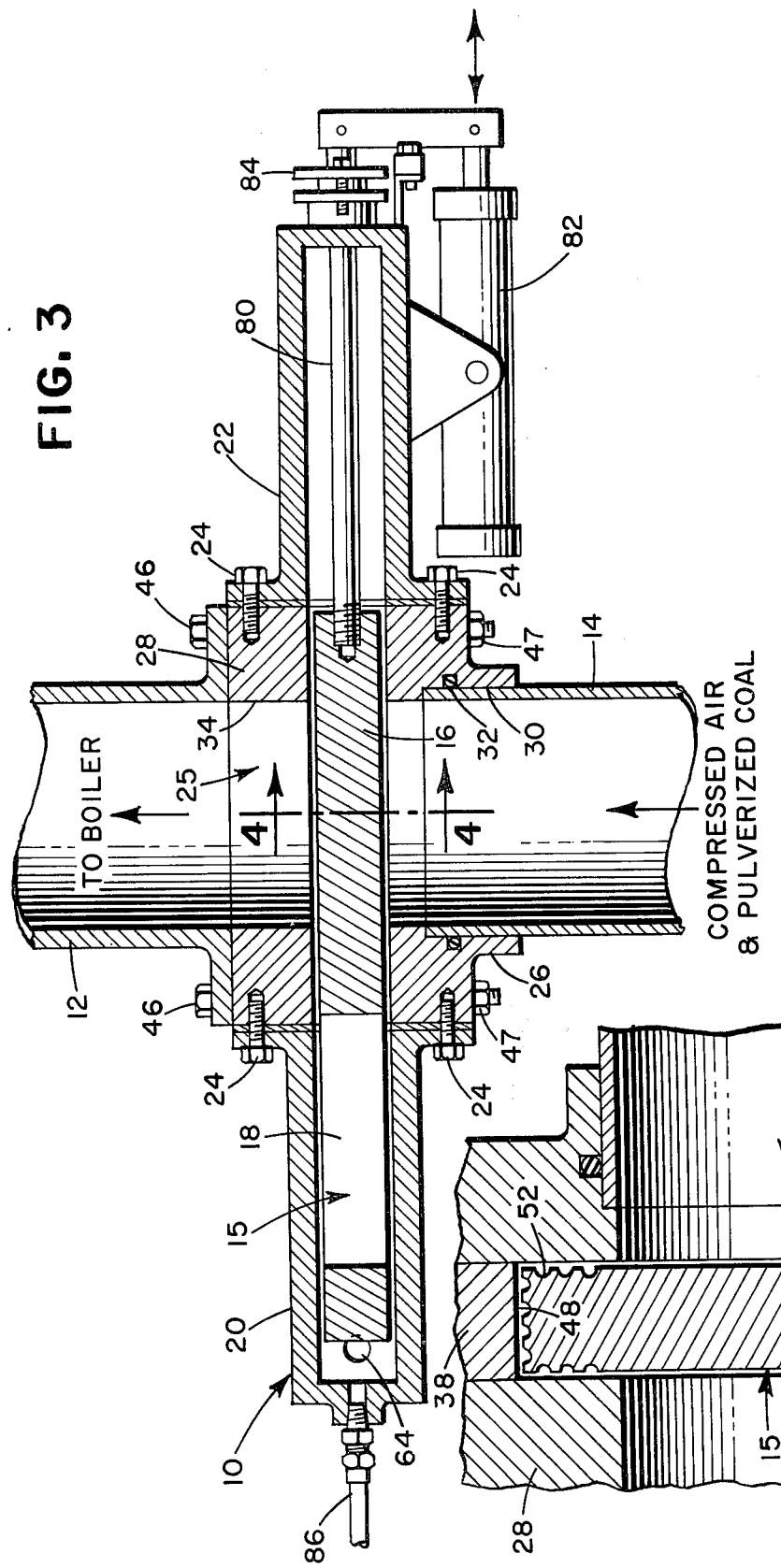

GATE VALVE DEVICE

BACKGROUND OF THE INVENTION

This invention relates to a gate valve device particularly adapted for use with powdered coal-fed utility boilers.

Modern steam generating utility boilers burn considerable quantities of powdered fuel. The powdered fuel, such as finely divided coal, is fed into the boiler through valves and the like. However, since the boiler is at a greater pressure than atmospheric, introduction into the boiler of the finely divided fuel creates many problems in managing the flow of the fuel into the boiler. Due to the powdered form of the coal, it becomes a nuisance by clogging valves and the like and also in polluting the air by being blown around in the power plant. Although many efforts have been attempted to solve this coal dust nuisance by providing improved coal feeding systems unto the boiler, to date none are known which effectively solve the problem.

BRIEF SUMMARY OF THE INVENTION

It is an object of this invention to provide a gate valve device to be used with means for introducing powdered coal into a boiler.

It is another object of this invention to provide an improved gate valve device which can effectively and efficiently be used to introduce powdered coal into a boiler without any dust nuisance problems.

A further object of this invention is to provide an improved gate valve device which can be automatically and efficiently operated, comprising an air seal which prevents coal dust from being blown out into the atmosphere.

Other objects will become apparent from the following description in connection with the drawings of a specific embodiment of the gate valve device of this invention.

DETAILED DESCRIPTION OF THE INVENTION

In the drawings:

FIG. 1 is a side elevational view of the gate valve device, partly in section;

FIG. 2 is a side sectional view of the gate valve device showing further details thereof;

FIG. 3 is a sectional view taken along line 3—3 of FIG. 1; and

FIG. 4 is a sectional view taken along line 4—4 of FIG. 3.

The gate valve device has an enclosed housing, generally designated by the numeral 10 which is adapted to be connected between a conduit 12 leading into a boiler and a feed conduit 14 delivering a mixture of compressed air and pulverized coal.

The gate valve device comprises a unitary gate valve 15, preferably cast iron, having a closure section 16 and an open section 18 having an opening therein large enough to present no obstruction in the path of the gases flowing from conduit 14 into conduit 12. The gate valve is adapted to move within the enclosed housing 10, which has rectangular end sections 20 and 22 connected by bolts 24 to a central section 25 having flange members 26 and 28. Flange member 26 has a circular opening 30 comparable in size to conduit 14 which is suitably connected in an airtight fitting using an O-ring 32 to provide a gas-tight seal. Flange member 28 also has a circular opening 34, comparable in size to opening 30 and is mounted on conduit 12 in an airtight manner.

At the top of the device, between the tops of flanges 26 and 28, there is provided a plate 38 provided with a series of transverse holes which align with holes 40 in flange 28 and holes 42 in flange 26. A plate 44 is provided at the bottom of the device between the bottoms of flanges 26 and 28 with respective holes in the bottom flanges and the plate 44. Flanges 26 and 28, plates 38 and 44 and conduit 12 are bolted together by means of bolts 46 and nuts 47 and other suitable means to provide an airtight chamber between the flanges 26 and 28. The entire assembly of end sections 20 and 22 along with the central flange section provide an airtight rectangular, longitudinal valve chamber in which the gate valve can be moved to an open and closed position.

Gate valve 15 is a trackless gate which moves reciprocally within housing 10 on surface 48 of plate 38 and surface 50 of plate 44 which, with the adjacent surfaces of flanges 26 and 28, provide a seat for gate valve 15. Tolerance between the gate valve 15 and surfaces 48 and 50 is kept to a minimum, e.g., no more than 1/64 inch, to prevent any particles of coal dust and the like from becoming lodged between the gate valve and these surfaces and clogging the valve. A plurality of serrations 52 and 54 are provided in the two sides of the valve and adjacent portions of the top and bottom of gate valve 15 along its length which provide restricted air passages between end sections 20 and 22 and which also reduce the contact area between gate valve 15 and its seat and thus the friction, cleanout holes 64 and 66 are provided in end sections 20 and 22 to permit removal of dust which accumulates in the end sections.

The gate valve is joined to an arm 80, which is reciprocally moved by convention piston means 82 and which is fitted in end portion 22 in a gas-tight fitting by packing glands 84.

The valve housing 10 is provided at its end portions 20 and 22 with respective compressed air hoses 86 and 88 which supply air to the valve chamber at a pressure greater than that of the boiler. With such a system, pressure within the boiler will not blow coal dust and the like back into the chambers in end portions 20 and 22.

In operation, the gate valve 15 is opened by activating piston means 82 by any conventional means (not shown) thus causing arm 80 to pull gate valve 15 from its closed position as shown in the drawings, to its open position, thus aligning its open section 18 of gate valve 15 with conduits 12 and 14. The compressed air which is supplied to end sections 20 and 22 by lines 86 and 88, respectively at a pressure greater than boiler pressure, which ordinarily is about 8–9 psi., causes air to continuously flow from the end sections along serrations 52 and 54 into the center section 25 of the housing and ultimately into the boiler. This feature of the gate valve device performs two vital functions, viz, it reduces substantially the friction caused by the close fit of gate valve 15 in the seat provided by plates 38 and 44 and provides a seal which keeps combustible gases out of the chambers in end portions 20 and 22 when the valve is closed and keeps dust out of these chambers when the valve is open.

Gate valve 15 is returned to its closed position by causing piston 82 to move arm 80 in the opposite direction and pushing gate valve 15 into its closed position shown in the drawings.

The gate valve device of the invention is suitable for use with gases, liquids or solids and is particularly adapted for use with the feeding of pulverized coal transported by compressed air into a utility boiler.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A trackless gate valve device disposed between and in combination with in-line inlet conduit means of a pressurized system and feed conduit means whereby fluid material can be fed to said pressurized system through said in-line feed means and inlet means and regulated by said device, said valve device comprising an elongated, sealed housing, gate valve means, and air pressure feed means, a. said housing disposed transverse to said in-line feed and inlet means and comprising a coextensive elongated rectangular chamber in open communication with said feed and inlet means; said housing comprising rectangular end sections connected to a midsection which contains opposing flange members to which said inlet means and said feed means are respectively connected; said opposing flange members connected by upper and lower plate members having flat inner surfaces which provide seat means for said gate valve means upon which said gate valve means is slidably moved;

b. said gate valve means comprising a solid gate valve disposed within said chamber and adapted to be moved reciprocally and slidably therein; said gate valve comprising an elongated, rectangular plate having a rectangular open section near one end thereof; said open section having a similar cross-sectional area as said feed means, whereas the other end of said gate valve is solid and has a cross-sectional area adequate to close said feed means; said gate valve comprising a plurality of longitudinal serrations disposed along the entire length of the top, bottom and sides adjacent said top and bottom, which provide restricted air passages therealong and which provide reduced friction for slidably moving said gate valve in said seat means;

c. means for moving said gate valve means slidably within said chamber between an open and closed position;

d. air pressure feed means disposed at both ends of said chamber for feeding air into said rectangular end sections and through said serrations, whereby said entire chamber is maintained at a pressure greater than the pressure in said pressurized system in both open and closed positions of said gate valve.

2. The gate valve device of claim 1 wherein said gate valve means are in combination with powered piston means whereby said valve means can be reciprocally moved within said chamber.

* * * * *